United States Patent [19]

France et al.

[11] Patent Number: 5,040,265
[45] Date of Patent: Aug. 20, 1991

[54] CASTORS

[75] Inventors: Paul S. France; Robert J. Hicks, both of London, England

[73] Assignee: Herok-RJK Limited, London, England

[21] Appl. No.: 640,544

[22] Filed: Jan. 14, 1991

Related U.S. Application Data

[63] Continuation of Ser. No. 434,739, Nov. 13, 1989, abandoned.

[30] Foreign Application Priority Data

Feb. 14, 1989 [GB] United Kingdom ............... 8903301
Nov. 22, 1989 [GB] United Kingdom ............... 8827215

[51] Int. Cl.⁵ .............................................. B60B 33/02
[52] U.S. Cl. ................................. 16/35 R; 280/33.994
[58] Field of Search .................. 16/35 R; 280/33.994; 188/1.12

[56] References Cited

U.S. PATENT DOCUMENTS

| 521,181 | 6/1894 | Riedel | 16/35 R |
| 2,583,858 | 1/1952 | Kostolecki | 16/350 |
| 2,654,112 | 10/1953 | Milhizer | 16/35 D |
| 3,636,586 | 1/1972 | Bollinger et al. | 16/35 |
| 3,751,758 | 8/1973 | Higbee et al. | 16/35 |
| 4,028,773 | 6/1977 | Morgan | 16/35 R |
| 4,037,291 | 7/1977 | Huempfner et al. | |
| 4,494,272 | 1/1985 | Morita et al. | |
| 4,543,685 | 10/1985 | Kassai | 16/35 R |

FOREIGN PATENT DOCUMENTS

| 0023432 | 2/1981 | European Pat. Off. | |
| 33003 | 2/1982 | Japan | 16/45 |
| 33004 | 2/1982 | Japan | 16/45 |
| 175403 | 10/1982 | Japan | 16/45 |
| 792374 | 3/1958 | United Kingdom | 16/35 R |
| 1353192 | 5/1974 | United Kingdom | 188/1.12 |

Primary Examiner—Richard K. Seidel
Assistant Examiner—Edward A. Brown
Attorney, Agent, or Firm—Armstrong, Nikaido, Marmelstein, Kubovcik & Murray

[57] ABSTRACT

The invention provides a castor wheel assembly 10 in which the swivel or castor axis 16 is locked when the wheel 11 is in the straight ahead position, but unlocked in any other position of motion, locking being caused by forward rotation of the wheel and released by backward rotation both without any braking action on the wheel. A supermarket trolley or similar vehicle equipped with a pair of such castors at the front end and conventional castors at the rear can be steered under normal circumstances by the rear castors but readily adapted to four wheel steering in confined spaced by slight reverse motion to unlock the front wheels' castor action.

11 Claims, 2 Drawing Sheets

CASTORS

This application is a continuation of application Ser. No. 434,739 filed Nov. 13, 1989, now abandoned.

FIELD OF THE INVENTION

This invention relates to swivel wheels and has particular but not exclusive relevance to castor wheels.

BACKGROUND OF THE INVENTION

Swivel wheels in general and castor wheels in particular have the ability to twist their horizontal wheel axis around a vertical swivel axis (regardless of whether that vertical axis passes through or is spaced from the horizontal wheel axis) so as to enable the vehicle or conveyance to which the wheel is attached to change its direction of travel. Such vehicles and conveyances, commonly provided with one or more pairs of swivel castors, find everyday use as trolleys for the transportation, distribution and storage of goods, merchandise and equipment in factories, warehouses, shops and offices and for the movement of patients in hospitals but are most commonly encountered as supermarket trolleys (shopping carts) and luggage trolleys (baggage carts) at airports and railway stations. These latter vehicles tend to be of such a design and construction that a plurality can be nested together to enable a large number to be moved at one time (for example during their collection from dispersed locations and return to a common storage and distribution site) and to create economy of storage space when they are not in use. However, to enable a collection of 20 or so nested trolleys to be moved together, it is essential that all wheels in contact with the ground are able to swivel freely. This in turn means that all four wheels of each trolley must be swivel wheels or that all but one pair of swivel wheels must be lifted clear of the ground as part of the nesting operation.

In general, supermarket and luggage trolleys are provided with four castor wheels. However, such an arrangement has the distinct disadvantage that it permits the trolley to travel in any direction in which the wheels may orient themselves, making steering of such vehicles extremely difficult especially on ramps or other uneven or irregular surfaces, when travelling at any substantial speed or when the castors become worn or fouled with dirt or other foreign material.

In order to overcome this disadvantage, a proposal has been made in European Patent Application No. 0023432 (Fisher) to lock the swivel on the rear wheels into a "straight ahead" position, the lock being released automatically by the act of nesting the trolleys together. However, since the lock operates solely under the action of gravity, there is no convenient means for regaining the castor action when the trolley is in use, it then being necessary to rely totally upon the front castor wheels for steering. This can, of course, cause difficulties when it becomes necessary to maneuver the trolley in confined spaces for example, and seems to destroy the concept of maneuverability for which the castors have been originally utilized.

A somewhat crude and rather unsatisfactory solution to the problem of providing a readily lockable and equally readily unlockable castor swivel has been proposed in U.S. Pat. No. 4,037,291 (Huempfner et al). In the system described a locking and releasing member comprising a shaft and a pair of spaced radially projecting fingers is mounted on the cart borne by the castor wheel so that the fingers can fall under gravity and lie one against each peripheral face of the wheel in its trailing position, the finger surface providing a smooth camming action so that reverse rotation of the wheel lifts the fingers to enable the castor action to be restored. However, the locking and releasing member is mounted on the cart and is not part of the castor wheel assembly The cart manufacturer must therefore include an additional manufacturing step in producing the cart. Also, since the fingers must be spaced apart by the width of the wheel, the locking and releasing member must be matched to the wheel with which it is to cooperate and a replacement wheel will probably not permit proper functioning. Further, if the locking and releasing unit fails, it will almost certainly do so in the locking position thereby destroying all castor action.

A much more sophisticated solution is described in U.S. Pat. No. 4,494,272 (Morita) in which the wheel is mounted in a sub-fork which is rockably pivoted to the main wheel fork, the latter being unable to swivel about the castor axis when the wheel is in forward rotation by virtue of a projection on the sub-fork being engaged by an abutment on the base on which the main fork is mounted. When rotation of the wheel is reversed, a brake operates to stop the wheel, the subfork upon which the brake is mounted rocks to disengage the projection from the abutment and the main fork is free to swivel about the castor axis. This arrangement has the very severe disadvantage that all of the embodiments described involve a very large number of small working parts. This in turn means that the component parts will be expensive to manufacture and assemble and that the complete castor will be considerably less rugged and reliable in operation.

SUMMARY OF THE INVENTION

Bearing in mind that the cost of the castors represents a very significant proportion of the total cost involved in the manufacture of a supermarket trolley or luggage trolley, it is essential that the cost of those castors is kept to a minimum consistent with the castors providing efficient and reliable service. With this objective clearly in mind, the present invention was devised in order to provide a wheel having a lockable and unlockable swivel action, which is self-contained and inexpensive to manufacture and assemble, requires no adaptation of the vehicle to which it is to be fitted and which is efficient and reliable in operation.

The present invention therefore seeks to provide a swivel wheel assembly in which the swivel action can be readily locked to prevent turning of the wheel about the swivel axis and equally readily unlocked to permit the wheel to turn freely about the swivel axis, both being achieved without any braking action on the wheel. In accordance with the invention, locking and unlocking of the swivel action is achieved as a result of the rotation of the wheel itself, rotation in one direction causing the swivel axis to lock and rotation in the opposite direction causing the swivel axis to unlock and permit free swivel motion.

The present invention therefore provides a swivel wheel assembly comprising a wheel mounted for rotation on an axle, a yoke in which the axle is mounted horizontally, a swivel axle mounted vertically on the yoke and about which the yoke and wheel can turn, and locking means adapted to releasably lock the yoke against turning about the swivel axle, the locking means being capable of being actuated without any braking action on the wheel to lock the yoke by rotation of the wheel in one direction and to release the yoke by rotation of the wheel in the opposite direction.

The invention is especially relevant to castor wheels in which the vertical swivel axis does not pass through the horizontal rotational axis of the wheel. In the description which follows, the invention is described in terms of such castor wheels although it is to be understood that it applies with equal relevance to non-castor swivel wheels in which the vertical swivel axis passes through the horizontal rotational axis of the wheel. In the case of such non-castor swivel wheels, however, it will be apparent that in certain circumstances it may be advantageous to provide locking means for releasably locking the yoke against turning about the swivel axle such that locking of the yoke can occur in either of two orientations, 180° opposed.

Generally, the locking means will be mounted on the yoke and will achieve its locking action by engaging a castor plate mounted non-rotatably on the castor axle. However, as described in detail below, there are alternative configurations in which the locking means is mounted directly on the wheel or wheel axle. The locking action is caused by rotation of the wheel in one direction on its axle, the locking action being achieved by the resulting motion of the rim or face of the wheel or of the axle itself.

DESCRIPTION OF THE DRAWINGS

By way of example only, three forms of castor assembly will now be described in greater detail with reference to the accompanying drawings, in which.

DESCRIPTION OF THE PREFERRED EMBODIMENTS

Figure 1:
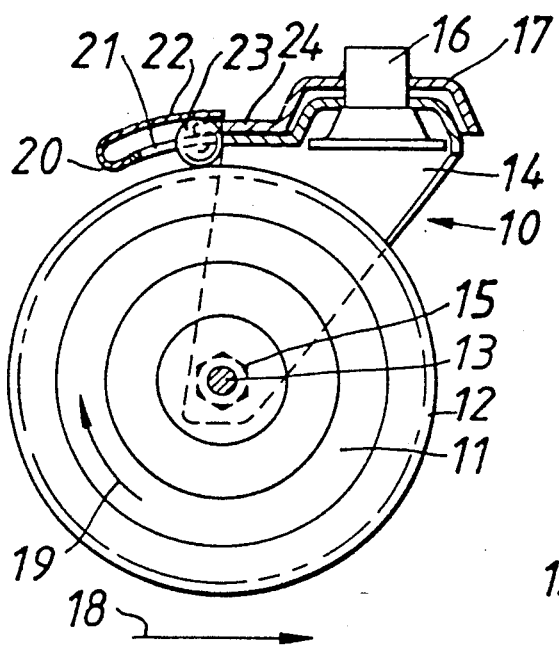
FIG. 1 is a side sectional view of a first form of castor assembly according to the invention.

Referring to FIGS. 1 to 6 of the drawings, a castor assembly 10 includes a wheel 11 provided with a hard rubber tire 12 mounted for rotation on an axle 13. The axle is itself mounted within a yoke 14 and retained by means of nuts 15. The yoke carries a vertical axle 16 about which it can swivel on suitable bearings (not shown) housed beneath a domed castor plate 17 which is secured to the vertical swivel axle for rotation with it. The swivel axle 16 may be provided with fastenings (not shown) appropriate to its intended use and by means of which it can be nonrotatably attached to a vehicle such as a supermarket trolley. Other designs can, however, be contemplated to provide free rotation of the yoke and non-rotatable attachment of the castor plate, with respect to the vehicle. In normal usage, the castor wheels will adopt an orientation such that the wheel axle 13 trails the swivel axle 16. The normal direction of motion of the assembly in the orientation shown in the drawings is indicated by the arrows 18 and the direction of rotation of the wheels 11 is indicated by the arrows 19.

Figure 2:
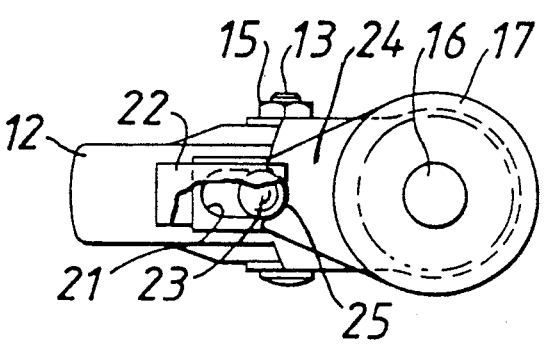
FIG. 2 is a partially cut away plan elevational view of the assembly of FIG. 1.

Referring now to FIGS. 1 and 2 only, it will be seen that the rear edge of the generally horizontal portion of the yoke 14 is provided with a rearwardly extending finger 20 having an elongated aperture 21, the finger 20 returning on itself in the form of a forwardly projecting spring arm 22. The aperture 21 accommodates a steel ball 23 which is retained in place between the tire 12 and the spring arm 22. The domed castor plate 17 is provided with a rearward extension 24 in the form of a generally horizontal flange provided with a notch 25 of such a size as to just accommodate the steel ball 23. In use, the swivel axle 16 is mounted on the vehicle to be supported by the castor assembly such that the notch 25 in the domed castor plate 17 faces to the rear of the vehicle. When the vehicle to which the castor is attached is propelled in a forward direction (as indicated by the arrow 18) the yoke 14 will turn about the swivel axle 16 so that the wheel axle 13 is trailing the swivel axle in the orientation shown in FIGS. 1 and 2. The ball 23 which is held against the tire 12 by the spring arm 22 will be carried forward by rotation of the wheel and will enter the notch 25 in the flange 24 of the domed castor plate and be held in that position by continued forward rotation of the wheel. In this position, the ball prevents the yoke turning about the swivel axle 16 and maintains the wheel 11 in the "straight ahead" position.

In order to release the swivel lock caused by the ball 23 being retained within the notch 25, the vehicle is first brought to a stop and its direction of motion is then reversed slightly. Reverse motion of the vehicle will cause the wheel 11 to rotate in the opposite direction and this in turn will cause the ball 23 to move back in the aperture 21 and be withdrawn from the notch 25 in the flange 24. Immediately following withdrawal of the ball from the notch, an action that unlocks the swivel axle 16 and returns its castor action, the reverse motion of the wheel will cause the yoke 14 to turn about the swivel axle until the wheel adopts its new orientation appropriate to the new direction of travel of the vehicle. In this new orientation, the ball 23 will simply bear against the rim of the castor plate 17 and exercise no locking function. However, as soon as the vehicle is redirected forwards, the wheel and yoke will turn about the swivel axle again so that the ball can re-enter the notch and lock the swivel axle in the straight ahead position. In practice, motion of the vehicle in a direction a few degrees either side of straight ahead will tend to permit the ball to force its way into the notch and therefore center the wheel into the straight ahead position.

Figure 3:
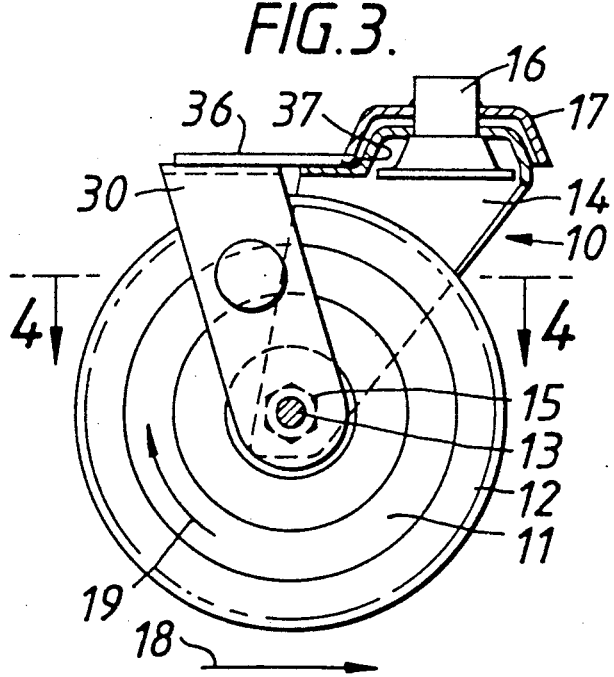
FIG. 3 is a side elevational view partly in section of a second castor assembly according to the invention.
Figure 4:
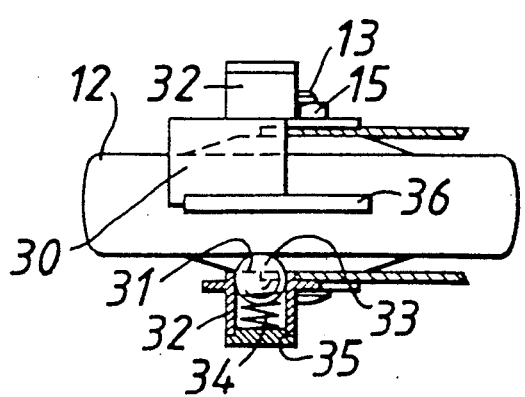
FIG. 4 is a partly cut away plan elevational view along 4—4 of the assembly of FIG. 3.

An alternative design of assembly according to the invention is shown in FIGS. 3 and 4. In this arrangement, an auxiliary yoke 30 is arranged across the top of the wheel and fastened for rotation about the wheel axle 13 by the wheel nuts 15. In FIGS. 3 and 4, the auxiliary yoke 30 is shown arranged outside the wheel yoke 14 but could equally effectively be arranged inside the wheel yoke 14.

Intermediate its length on both sides of the wheel the yoke 30 is provided with a circular aperture 31 surrounded by an upstanding annulus 32. The aperture 31 serves to accommodate a steel ball 33 which is urged against the face of the wheel 11 by a small compression spring 34 housed within the annulus 32 and bearing against a closure cap 35. At its top where is passes over the tire 12 the auxiliary yoke 30 is provided with a forwardly projecting pin 36. The free end of the pin 36 is adjacent the domed castor plate 17 which is attached to and rotatable with the swivel axle 16 and which has in its circumference a rearward facing opening 37 of a size and disposition to accommodate the free end of the pin 36.

Motion of the vehicle to which the castor assembly is attached in the direction of arrow 18 will 1 cause the wheel 11 to rotate in the direction of the arrow 19. By virtue of the balls 33 being urged against the faces of the wheel 11, the auxiliary yoke 30 will then move in the same direction as the wheel about the axle 13 until the free end of the pin 36 abuts the circumference of the castor plate 17. When the vehicle is in forward motion with the wheel in the "straight ahead" position, the pin is aligned with and will enter the opening 37 in the castor plate 17 thereby locking the swivel axle against turning. As with the embodiment described above with reference to FIGS. 1 and 2, reverse rotation of the wheel will cause unlocking of the swivel axle and return to full castor action, the swivel lock being re-engaged when the wheel returns to the "straight ahead" position.

Figure 5:
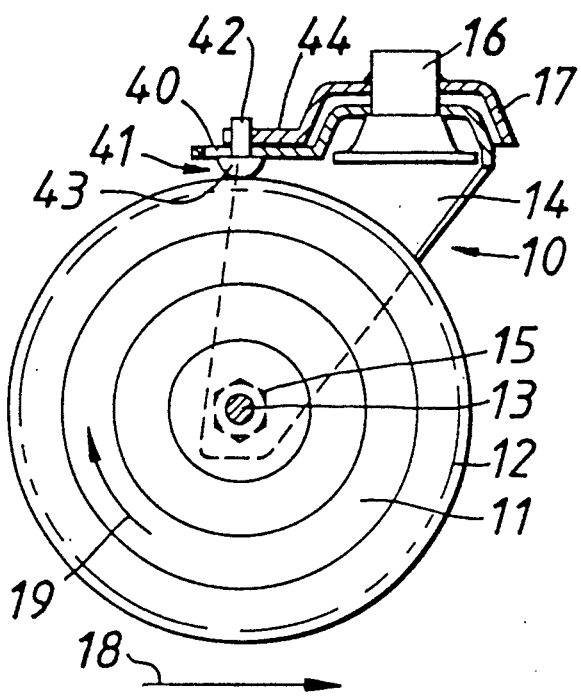
FIG. 5 is a side sectional view of a third form of castor assembly according to the invention.
Figure 6:
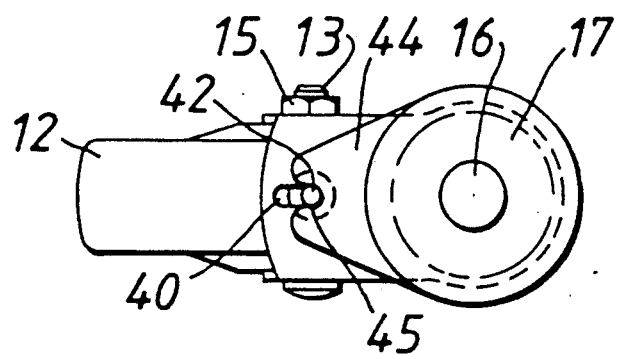
FIG. 6 is a plan elevational view of the assembly of FIG. 5.

Referring now to FIGS. 5 and 6, there is shown a still further design which is generally similar to that shown in FIGS. 1 and 2. In the arrangement of FIGS. 5 and 6, a closed longitudinal slot 40 is provided in the top face of the yoke 14 adjacent its trailing edge. This slot accommodates the upright leg 42 of a generally inverted mushroom-shaped locking member 41, the leg 42 being able to slide freely to and fro along the length of the slot. The base 43 of the inverted mushroom-shaped member 41 has a generally domed aspect and rests under its own weight against the tire 12, the frictional engagement between the base 43 and tire 12 being extremely small but nevertheless sufficient for movement of the tire as a result of rotation of the wheel, to urge the member 41 in one direction or the other along the slot 40. The domed castor plate 17 is provided in this embodiment with a rearward extension 44 in the form of a flange provided with a notch 45 of such a size as to accommodate the leg 42 of the member 41

In use, the swivel axle 16 is mounted on a vehicle such that the notch 45 in the flange 44 on the domed castor plate 17 faces to the rear of the vehicle. When the vehicle is propelled in a forward direction (as indicated by arrow 18), the yoke 14 will turn about the swivel axle 16 so that the wheel axle 13 is trailing the swivel axle in the orientation shown in FIGS. 5 and 6. The locking member 41 will then be carried forward by the rotation of the wheel and its leg 42 will enter the notch 45 in the flange 44 of the castor plate and be held in that position by continued forward rotation of the wheel. In order to facilitate entry of the leg 42 into the notch 45, the flange adjacent the open end of the notch 45 has rounded edges. This will assist in guiding the leg 42 into the notch as the wheel approaches the "straight ahead" position. Also, the notch may with special advantage be formed with a width somewhat greater than that of the leg 42, preferably such that some very slight swivel action can be maintained about the swivel axle 16, for example 5° of arc. This slight swivel action enables the vehicle to provide a better ride and to be maintained under better control, especially when cornering, than if no swivel action is permitted but still presents the advantages associated with the "locked" castor action. This refinement can, of course, be applied to all embodiments.

In order to release the swivel lock caused by the leg 42 being retained within the notch 45, the vehicle is first brought to a stop and its direction of motion is then reversed slightly. Reverse motion of the vehicle will cause the wheel to rotate in the opposite direction and this in turn will cause the locking member 41 to move backwards so that the leg 42 moves back in the slot 40 and be withdrawn from the notch 45 in the flange 44. Immediately following withdrawal of the leg from the notch, an action that unlocks the swivel axle 16 and returns its castor action, the reverse motion of the wheel will cause the yoke 14 to turn about the swivel axle until the wheel adopts its new orientation appropriate to the new direction of travel of the vehicle. In this new orientation, the leg 42 will simply bear against the rim of the castor plate 17 and exercise no locking function.

The embodiment described with reference to FIGS. 1 and 2 above has the advantage that it is quite simple and inexpensive to manufacture. However, since the ball contacts the tire of the wheel the locking mechanism may become fouled by dirt or other foreign material picked up by the tire although the constant rotation of the ball and the scraping action of the edges of the notch in the castor plate will tend to have a self-cleaning effect. The embodiment described above with reference to FIGS. 3 and 4 does not suffer from this disadvantage and although it is of more complex action, it is nevertheless more amenable to rugged construction.

The embodiment described above with reference to FIGS. 5 and 6 has the special advantage that it is particularly straightforward and inexpensive to manufacture and despite its simplicity of construction and action, has proved itself to be extremely rugged and reliable in operation.

It is important to note that in all three embodiments described above, there is no braking action on the wheel in order to effect locking or unlocking of the swivel action. In all cases, the element which bears against the wheel (the ball 23, balls 33 and member 43) are maintained in contact with the wheel 11 or tire 12 at all times, and not merely when the locking or unlocking has to be effected.

It will be quite apparent from the above description that numerous modifications and alterations can be made to the castor assemblies without departing from the scope of the invention. Thus, for example, the auxiliary yoke may serve to retain only one ball to bear against one side of the wheel; rubber or plastics balls may be used in place of the steel balls described above; rollers or even friction pads may be used in place of the balls; the locking means may be arranged to bear against the wheel axle when the latter is adapted to rotate with the wheel or indeed against any duplication, addition or extension of the wheel or wheel axis which rotates with the wheel; and the disk-shaped wheel shown in the drawings can be replaced by the generally cylindrical or spherical type of wheels especially favoured by furniture manufacturers. Also, although the invention has been described above in terms of a yoke and the embodiments shown in the drawings have yokes which support both ends of the wheel axles, it should be understood that yoke arrangements involving support of only one end of the wheel axle or support of the center of the wheel axle in a swivel wheel assembly with two wheels, are equally applicable.

As stated above castor wheel assemblies according to the invention are especially useful for attachment to supermarket trolleys and baggage trolleys but are extremely useful also for numerous other conveyances and vehicles in use in industry and commerce. In general, the castor assemblies will be fitted in pairs as the front wheels of four wheel vehicles, the rear wheels being either conventional castors or of noncastor construction. However, in many circumstances, it may be possible to achieve the main benefits of the invention when only one of the front pair of wheels is formed by a castor assembly of the invention. With vehicles adapted or required to be moved in either direction, for example trolleys for the transportation of patients in hospitals or library trolleys, it will prove especially advantageous to use castor assemblies according to the invention for all four wheels (or alternatively one of each of the front and rear pairs) with the castors at opposite ends mounted in opposite directions to ensure that in whatever direction the trolley is moved, the rear wheels will always have a full castor function whereas one or both of the front wheels will be locked when the trolley is being moved in the straight ahead position.

In the case of supermarket and luggage trolleys which are designed to be nested, a plurality of nested trolleys can be simply moved in reverse so that the front castor assemblies according to the invention will operate in the unlocked condition, permitting ready maneuverability.

We claim:

1. A swivel castor assembly comprising:
   a wheel mounted for rotation on an axle;
   a yoke in which the axle is mounted horizontally;
   a swivel axle mounted vertically on the yoke and about which the yoke and wheel can turn; and
   locking means, for releasably locking the yoke against turning about the swivel axle, the locking means being capable of being actuated, without any braking action on the wheel, a) to lock the yoke by rotation of the wheel about the axle and b) to release the yoke by counterrotation of the wheel about the axle.

2. A swivel castor assembly according to claim 1, wherein the locking means is mounted on the yoke.

3. A swivel castor assembly according to claim 1, wherein the locking means is mounted on the wheel axle.

4. A swivel castor assembly according to any one of claims 1 to 3, wherein the locking means is actuated by rotation of the wheel, causing movement of a wheel rim.

5. A swivel castor assembly according to any one of claims 1 to 3, wherein the locking means is actuated by rotation of the wheel by movement of a face of the wheel.

6. A swivel castor assembly according to any one of claims 1 to 3, wherein the locking means is actuated by rotation of the wheel causing movement of the wheel axle.

7. A swivel castor assembly according to any one of claims 1 to 3, wherein the swivel axis does not pass through the wheel axis.

8. A supermarket trolley or similar vehicle mounted on two pairs of castor wheels, at lest one of the pair of wheels mounted at a front end thereof being a swivel castor assembly comprising:
   a wheel mounted for rotation on an axle;
   a yoke in which the axle is mounted horizontally;
   a swivel axle mounted vertically on the yoke and about which the yoke and wheel can turn; and
   locking means for releasably locking the yoke against turning about the swivel axle, the locking means being capable of being actuated, without any braking action on the wheel, a) to lock the yoke by rotation of the wheel about the axle and b) to release the yoke by counterrotation of the wheel about the axle wherein the swivel axis does not pass through the wheel axis.

9. A swivel castor assembly according to claim 4, wherein the swivel axis does not pass through the wheel axis.

10. A swivel castor assembly according to claim 5, wherein the swivel axis does not pass through the wheel axis.

11. A swivel castor assembly according to claim 6, wherein the swivel axis does not pass through the wheel axis.

* * * * *